United States Patent [19]

Komurasaki

[11] Patent Number: 4,978,883

[45] Date of Patent: Dec. 18, 1990

[54] VIBRATION DETECTING DEVICE

[75] Inventor: Satoshi Komurasaki, Himeji, Japan

[73] Assignee: Mitsubishi Denki Kabushiki Kaisha, Tokyo, Japan

[21] Appl. No.: 411,290

[22] Filed: Sep. 22, 1989

[30] Foreign Application Priority Data

Oct. 12, 1988 [JP] Japan .................................. 63-254762
Apr. 18, 1989 [JP] Japan .................................. 64-96224

[51] Int. Cl.$^5$ ............................................. H01L 41/08
[52] U.S. Cl. ........................................... 310/329; 73/35
[58] Field of Search ............. 310/329; 73/35, DIG. 1, 73/DIG. 4, 651, 654

[56]  References Cited

U.S. PATENT DOCUMENTS

| | | | |
|---|---|---|---|
| 3,060,333 | 10/1962 | Bradley, Jr. ........................ | 310/329 |
| 3,389,276 | 6/1968 | Gradin et al. ................... | 310/329 X |
| 3,400,284 | 9/1968 | Elazar ............................. | 310/329 X |
| 4,225,802 | 1/1980 | Suzuki et al. ...................... | 310/329 |
| 4,359,658 | 11/1982 | Cartier ............................ | 310/329 X |
| 4,399,705 | 8/1983 | Weiger et al. .................. | 310/329 X |
| 4,660,409 | 4/1987 | Miyata et al. ........................... | 73/35 |
| 4,869,095 | 9/1989 | Komurasaki .................... | 310/329 X |

FOREIGN PATENT DOCUMENTS 0184666  6/1986  European Pat. Off. ................ 73/35

Primary Examiner—Mark O. Budd
Attorney, Agent, or Firm—Sughrue, Mion, Zinn, Macpeak and Seas

[57]  ABSTRACT

A vibration detecting device which comprises a bush of metal having a cylindrical portion at its center; a casing of a resinous material which is formed by insertion-molding along with the bush so as to form a receiving portion at the outer side of the cylindrical portion; a piezoelectric element, a terminal and a weight placed along the outer periphery of the cylindrical portion of the bush in the receiving portion; a nut fastened to the cylindrical portion to secure the piezoelectric element, the terminal and the weight, and a filler for sealing the nut and the other elements received in the receiving portion, wherein one side of the receiving portion with respect to the vibration detecting direction is open.

2 Claims, 6 Drawing Sheets

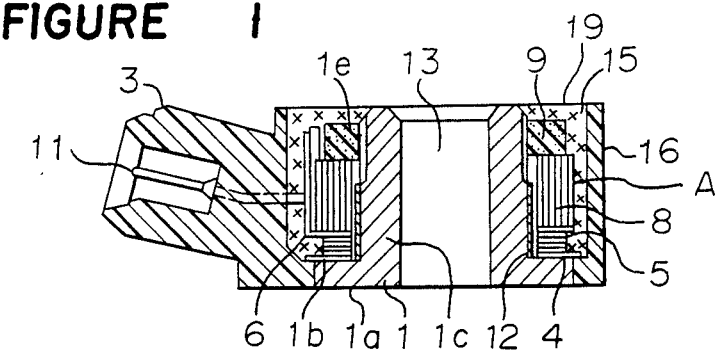
FIGURE 1
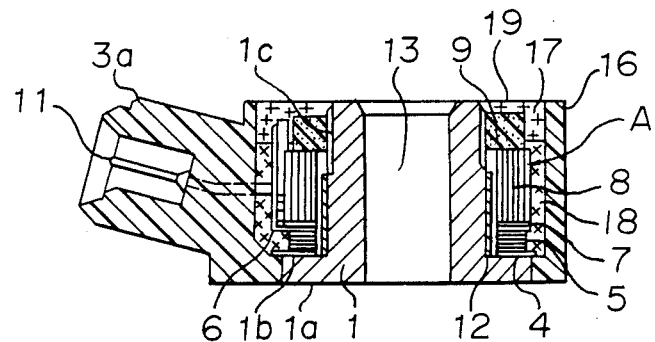
FIGURE 3
FIGURE 4
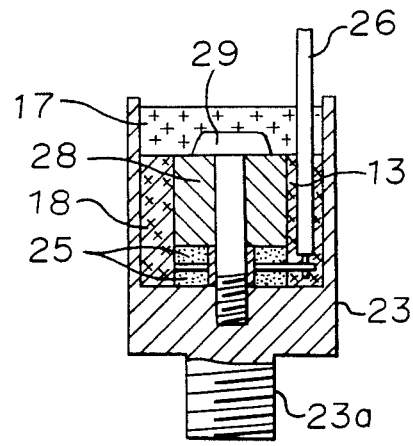

FIGURE 5 (a) PRIOR ART
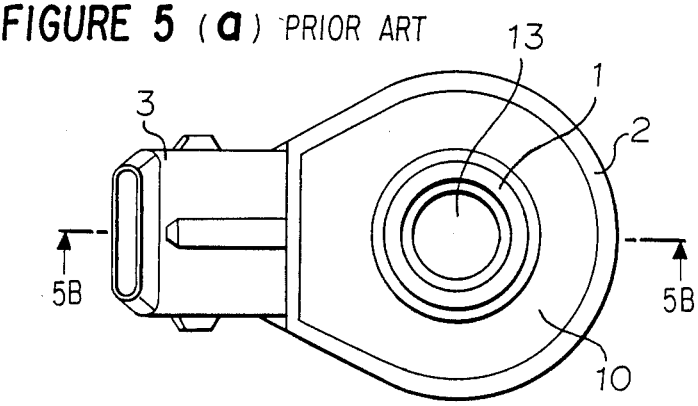
FIGURE 5 (b) PRIOR ART
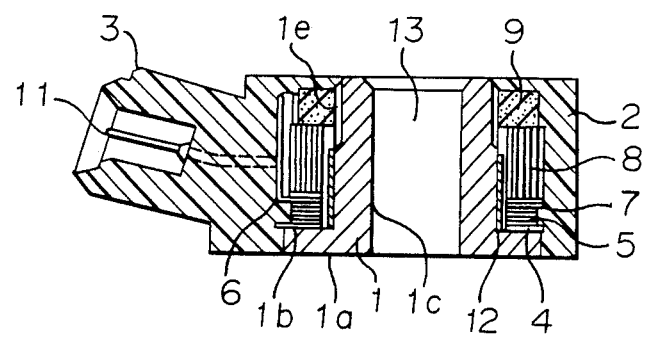

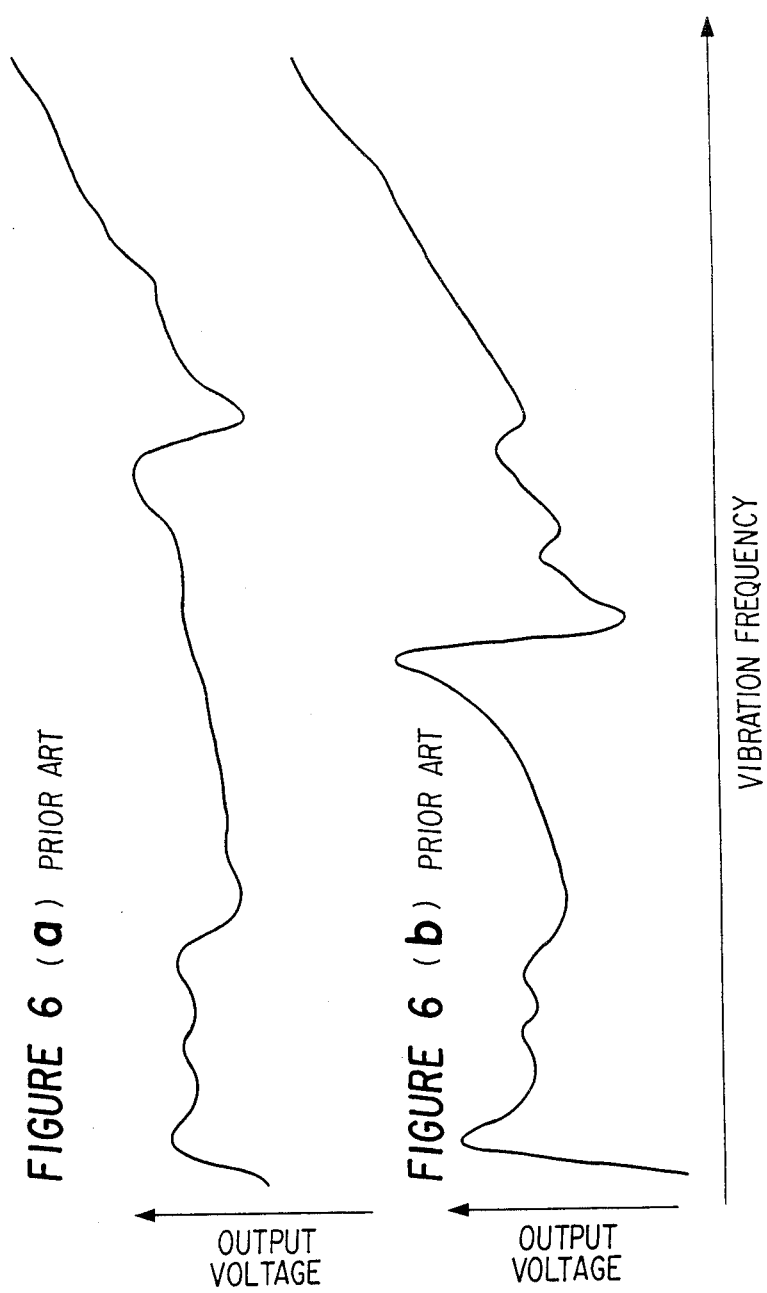

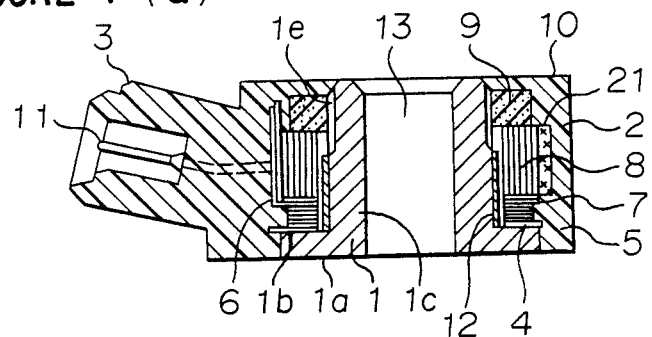
FIGURE 7 (a) PRIOR ART
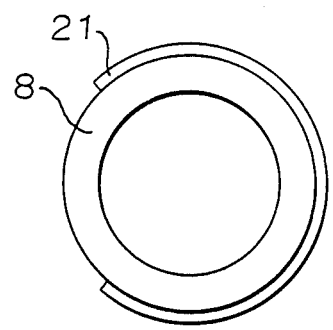
FIGURE 7 (b) PRIOR ART

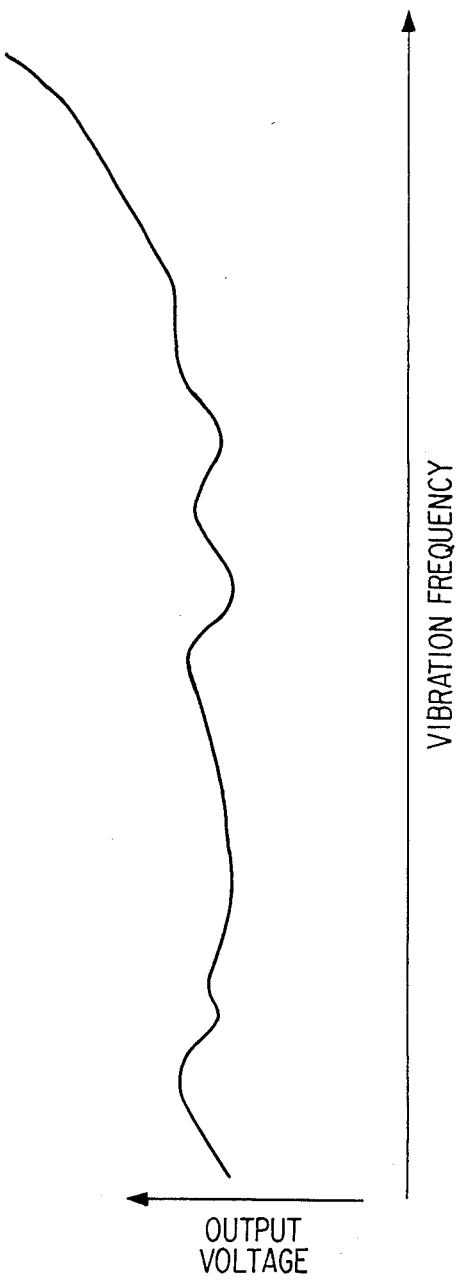

VIBRATION DETECTING DEVICE

BACKGROUND OF THE INVENTION

1. FIELD OF THE INVENTION

The present invention relates to a vibration detecting device for detecting knocking by the detection of vibrations in, for instance, an internal combustion engine.

2. DISCUSSION OF BACKGROUND

FIGS. 5a and 5b are respectively a plan view and a cross-sectional view taken along a line II—II in FIG. 5a which show a conventional vibration detecting device. In FIGS. 5a and 5b, a reference numeral 1 designates a bush made of metal which has a bolt-insertion hole 13 at its center. The bush 1 also has a flange and a cylindrical portion 1c around which structural elements are assembled. The flange of the bush 1 has a seating surface 1a which is to be in contact with an internal combustion engine when the vibration detecting device is mounted on it and a base surface 1b on which the structural elements are stacked in the vertical direction. A numeral 2 designates a casing of a resinous material which is formed by insertion-molding or injection along with the bush 1 so as to form a receiving portion at the outer side of the cylindrical portion of the bush 1. The casing 2 also constituted a housing of the vibration detecting device. A numeral 3 designates a connector extending from a part of the casing 2 outwardly and having an output terminal 11 for outputting a detection signal. A numeral 4 designates a plate placed on the base surface 1b of the flange of the bush 1. A numeral 5 designates a piezoelectric element which converts vibrations into an electric signal. The piezoelectric element 5 has its reference electrode connected to the plate 4. A numeral 6 designates a terminal electrically connected to the output electrode of the piezoelectric element 5 to output a detection signal. A numeral 7 designates an insulating sheet made of a film of polyethylene terephthalate (PET) or polyphenylene sulfite (PPS) or the like which is disposed on the opposite side of the terminal 6 which is in contact with the piezoelectric element 5. A numeral 8 designates a weight which applies a vibrating stress to the piezoelectric element 5. A numeral 9 designates a nut fastened to a threaded portion formed in the outer circumference of the cylindrical portion 1c of the bush 1 in order to fit structural elements of the vibration detecting device such as the plate 4, the piezoelectric element 5, the terminal 6, the insulating sheet 7 and the weight 8. A numeral 12 designates an insulating tube made of an adhesive tape or a heat-shrinkable tube which is interposed between the bush 1 and the structural elements. The detection signal obtained at the piezoelectric element 5 is outputted at the output terminal 11 via the terminal 6 and the connector 3.

FIGS. 6a and 6b are respectively diagrams showing examples of the frequency characteristics obtained by the conventional vibration detecting device as shown in FIG. 5.

FIG. 7a is a longitudinal cross-sectional view of another conventional vibration detecting device. The same reference numerals as in FIG. 5 designate the same or corresponding parts. In the conventional vibration detecting device, a cushioning material 21 is placed between the outer circumference of the weight 8 and the inner circumference of the casing 2 to weaken the mechanical connection between them. As a material for the casing, polybutylene terephthalate (PBT) is generally used because it is relatively hard and it is excellent in transmitting vibrations in a vibration detecting system.

FIG. 7b is a plan view showing a state of the weight 8 assembled with the cushioning material 21. In this case, the cushoning material 21 does not extend to the contacting portion between the output terminal 11 and the terminal 6.

FIG. 8 is a diagram showing an example of the frequency characteristic of the conventional vibration detecting device as shown in FIG. 7.

In the following, the principle of detecting vibrations will be described. The vibration detecting device is fixed to an internal combustion engine by means of a bolt (not shown) inserted through the bolt-insertion hole 13 of the bush 1 so that the seating surface 1a is in contact with a portion of the internal combustion engine. Vibrations result depending on the operational condition of the internal combustion engine and are transmitted to the vibration detecting device via the seating surface 1a. Since the piezoelectric element 5 and the weight 8 are assembled in an overlapping state on the bush 1, an inertial stress in the weight 8 is transmitted to the piezoelectric element 5 depending on the vibrations. When the piezoelectric element 5 receives the inertial stress, a detection signal in proportion to the magnitude of the inertial stress is produced so that a detection signal is outputted to the output terminal of the electrode. The intensity of the detection signal is based on a potential at the plate side electrode of the piezoelectric element 5. Because the plate 4 is made of metal, the potential at the reference electrode of the piezoelectric element 5 is the same as the bush 1. On the other hand, the potential at the weight 8 is the same as the reference electrode of the piezoelectric element 5 because the nut 9 and the weight 8 are made of metal. Therefore, the terminal 6 is insulated from the weight 8 by interposing the insulating sheet 7. Thus, the detection signal from the piezoelectric element 5 is obtained from the output terminal 11 via the terminal 6. Since the insulating tube 12 is arranged around the cylindrical portion 1c of the bush 1, there is no danger of short-circuiting between the terminal 6 and the cylindrical portion 1c of the bush even when there is some deflection on the terminal 6 when it is assembled. Therefore, provision of the insulating tube 12 is important to obtain a correct detection signal.

Since the vibration detecting device as shown in FIG. 5 has strong mechanical connection between the casing 2 and the weight 8, undesired vibrations are transmitted from the casing 2 of a resinous material to the weight 8 whereby a distortion takes place in the inertial stress. Accordingly, a distortion takes place in the output voltage of the vibration detecting device even though vibrations having a constant amplitude are applied to the seating surface 1a. When the output voltage has such distortion, a high output is produced at a high frequency side, and a flat frequency characteristic can not be obtained even in a low frequency region as shown in FIG. 6a and 6b.

In order to eliminate the above-mentioned problem, there has been proposed to use the cushioning material 21 between the casing 2 and the weight 8 as shown in FIG. 7. The cushioning material 21 cuts undesired vibrations from the casing 2 to the weight 8 and prevents the weight 8 from transmitting an inertial stress which causes uneven output characteristic. An inertial stress which collectly follows the vibrations applied to the device is given to the piezoelectric element 5, whereby an output voltage having a flatter frequency characteristic as shown in FIG. 8 is obtainable. As the cushioning material 21, a resinous material having a DURO METER hardness of at most A-50 is preferably used. However, a resinous material having a DURO METER hardness more than A-50 may be utilized depending on a requsitie frequency characteristic level. A sufficient effect can be obtained by using rubber or an epoxy resin which is softer than polybutylene terephtalate used for the casing 2. For instance, by suitably changing the shape of the output terminal 11 and the metallic terminal 6 and by suitably arranging the cushioning material 21 around the entire circumferential portion of the weight 8, a further excellent effect can be obtained (in comparison with the embodiment as shown in FIG. 7b wherein the cushioning material 21 is arranged at the portion except the connecting portion of the output terminal 11 and the terminal 6). In order to obtain further effect, the cushioning material 21 is extended to the area of the nut 9 to isolate the vibrations from the casing 2 so that the undesired vibrations are not transmitted to the weight 8.

In the conventional vibration detecting device as shown in FIG. 7, the frequency characteristic can be improved to some extent. However, it is insufficient to isolate undesired vibrations by arranging the cushioning material around the weight because the mechanical connection between the weight and the casing is still strong. In the conventional vibration detecting device, uneven frequency characteristic curve as shown in FIG. 8 is found and an output voltage varies depending on frequencies.

SUMMARY OF THE INVENTION

It is an object of the present invention to provide a vibration detecting device capable of producing a constant detection output voltage regardless of frequencies.

The foregoing and other objects of the present invention have been attained by providing a vibration detecting device which comprises a bush of metal having a cylindrical portion at its center; a casing of a resinous material which is formed by insertion-molding along with the bush so as to form a receiving portion at the outer side of the cylindrical portion; a piezoelectric element, a terminal and a weight placed along the outer periphery of the cylindrical portion of the bush in the receiving portion; a nut fastened to the cylindrical portion to secure the piezoelectric element, the terminal and the weight, and a filler for sealing the nut and the other elements received in the receiving portion, wherein one side of the receiving portion with respect to the vibration detecting direction is open.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1 is a longitudinal cross-sectional view of an embodiment of the vibration detecting device according to the present invention;

FIG. 3 is a longitudinal cross-sectional view of another embodiment of the vibration detecting device of the present invention;

FIG. 4 is a longitudinal cross-sectional view of another embodiment of the present invention;

FIG. 5a is a front view of a conventional vibration detecting device;

FIG. 5b is a cross-sectional view taken along a line 5b—5b in FIG. 5a;

FIG. 6a and FIG. 6b are respectively diagrams showing the frequency characteristics of the conventional vibration detecting device;

FIG. 7a and 7b are longitudinal cross-sectional view and a partial plan view of another conventional vibration detecting device; and FIG. 8 is a diagram showing the frequency characteristic of the conventional device as shown in FIG. 7.

DETAILED DESCRIPTION OF PREFERRED EMBODIMENTS

Figure 2:
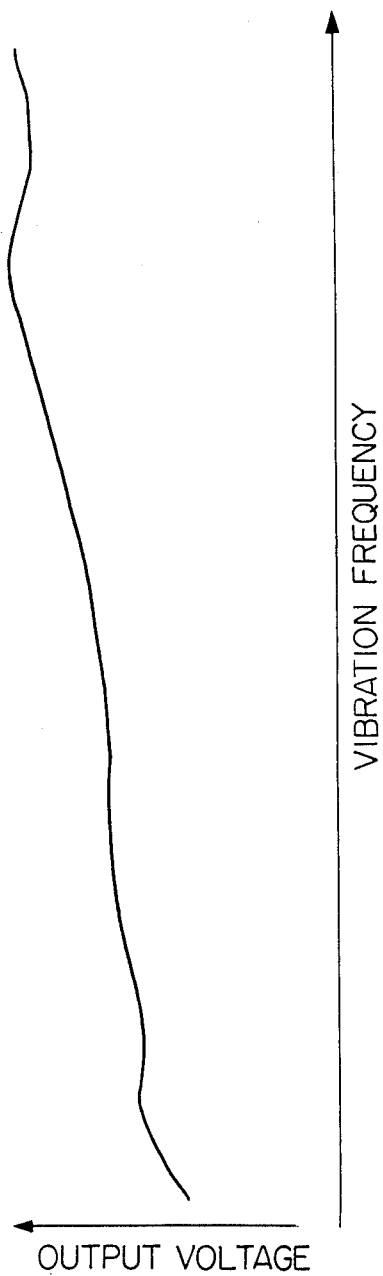
FIG. 2 is a diagram showing the frequency characteristic of the frequency detecting device as shown in FIG. 1.

Referring to the drawings, wherein the same reference numerals designate the same or corresponding parts throughout the several views, and more particularly to FIG. 1 thereof, there is shown a longitudinal cross-sectional view of a typical example of the vibration detecting device of the present invention. In FIG. 1, a reference numeral 15 designates a filler for sealing a receiving portion formed between the bush 1 and the casing 2. FIG. 2 shows the frequency characteristic of the vibration detecting device as shown in FIG. 1.

A casing 16 formed by injection-molding is generally of an annular shape and its lower portion is firmly connected to the outer circumference of the flange of the bush 1 made of metal. An annular opening 19 is formed at the upper portion and an annular space is formed as a receiving portion or cavity between the outer circumference of the cylindrical portion 1C of the bush 1 and the inner circumference of the casing 16. In the receiving portion, structural elements such as the piezoelectric element 5, the weight 8 and so on are received. In the same manner as the conventional vibration detecting device as shown in FIGS. 5 and 7, the plate 4, the piezoelectric element 5, the terminal 6, the weight 8 and the nut 9 are assembled on the bush 1 in this order, and the filler 15 is filled in the annular space between the outer side portions of the structural elements and the inner circumference of the casing and the annular opening 19 whereby the structural elements including the nut 9 are entirely sealed. As the filler 15, a resinous material such as epoxy resin having a DURO METER hardness of from about A-40 to about A-5, more preferably from A-30 to A-5 can be used. For instance, XN10119N or XN1124 (tradenames, manufactured by Nagase-Ciba Kabushiki Kaisha) or TSE-30 (tradename, manufactured by Toshiba Silicone Kabushiki Kaisha) can be used.

The filler 15 sufficiently reduces the mechanical connection between the weight 8 and the casing 16 whereby undesired vibrations from the casing, can not be transmitted to the weight, and a substantially flat frequency characteristic as shown in FIG. 2 can be obtained.

FIG. 3 is a longitudinal cross-sectional view of another embodiment of the vibration detecting device of the present invention. In FIG. 3, the same reference numerals designate the same or corresponding parts, and therefore, description of these parts is omitted. A vibration-electric transducing section A which is constituted by the plate 4, the piezoelectric element 5, the insulating sheet 7, and the weight 8 is placed in the receiving portion between the cylindrical portion 1c of the bush 1 and the casing 16. A first filler 18 of gel-like silicone resin is filled in a space formed between the outer side portion of the vibration-electric transducing section A and the inner circumference of the casing 16. A second filler 17 having a hardness higher than the first filler 18 is filled on the second filler to reach the annular opening portion 19. The DURO METER hardness of the second filler is preferably more than A-45. As such material, XN1133 or XN1213 (tradenames manufactured by Nagase-Ciba Kabushiki Kaisha). As the first filler 18, KE104 (tradename, manufactured by Shin-ethu Kagaku Kabushiki Kaisha) can be used.

By filling the gel-like first filler 18 in the space between the outer side of the vibration-electric transducing section A and the inner circumference of the casing 16, the mechanical connection between the weight and the casing is weakened, whereby the basic frequency characteristic curve in the room temperature becomes flat and the frequency characteristic even in a temperature change is also flat.

The hardness of the second filler 17 is higher than that of the first filler 18. Accordingly, excellent resistance to environment and excellent resistance to liquid can be maintained.

FIG. 4 shows another embodiment of the present invention which is utilized for the vibration detecting device disclosed in Japanese Examined Utility Model Publication No. 23730/1985. In FIG. 4, a vibration-electric transducing section comprising piezoelectric elements 25, a weight 28 and so on is fixed to a housing 23 by using a bolt 29. The housing 23 has a fitting screw 23a projecting downwardly, at its lower surface.

The first filler 18 of gel-like silicone resin is filled in the space formed between the inner circumference of the housing 23 and the outer circumference of the vibration-electric transducing section, and the second filler 17 is filled at the opening portion to seal the first filler 18. The hardness of the second filler 17 is higher than that of the first filler 18. The first and second fillers 18, 17 are the same as those used in the embodiment as shown in FIG. 3.

In a case that the filler 15 as in FIG. 1 is used and it is left under high temperature condition, resistance to environment and resistance to liquid might be deteriorated. It is because the filler 15 is prepared by mixing a main agent and a curing agent followed by heating for curing. When the filler 15 is soft after the curing, it provides excellent vibration detecting characteristic. However, if it is left under the high temperature condition, it becomes harder and becomes brittle. In this case, the-flat frequency characteristic may not be obtained.

The embodiment as shown in FIG. 4 improves the above-mentioned problem.

As described above, in accordance with the present invention, the piezoelectric element receives an inertial stress by vibrations correctly from the weight, whereby an output voltage having flat frequency characteristic can be obtained.

Obviously, numerous modifications and variations of the present invention are possible in light of the above teachings. It is therefore to be understood that within the scope of the appended claims, the invention may be practiced otherwise than as specifically described herein.

What is claimed is:

1. A vibration detecting device, comprising:
a metal bush having a central cylindrical portion;
a generally cylindrical casing of resinous material formed by injection-molding and surrounding said central cylindrical portion of the bush to define therewith an annular cavity open at an upper end and closed at a bottom end by a flange of the bush;
a piezoelectric element, a terminal and a weight disposed around an outer periphery of said central cylindrical portion of the bush within said cavity;
a nut fastened to said central cylindrical portion to secure said piezoelectric element, said terminal and said weight in place, and
a filler for sealing said nut, said piezoelectric element, said terminal and said weight in said cavity, wherein said filler comprises a first filler of gel-like silicone resin surrounding outer portions of said piezoelectric element, said terminal and said weight and a second filler overlying said first filler and closing the open upper end of the cavity, said second filler being harder than said first filler.

2. The vibration detecting device according to claim 1, wherein said first filler has a DURO METER hardness of A-40-A-5 and said second filler has a DURO METER hardness of more than A-45.

* * * * *